US010616418B2

(12) United States Patent
Reddy (10) Patent No.: US 10,616,418 B2
(45) Date of Patent: Apr. 7, 2020

(54) DYNAMICALLY GENERATED CALL TRIGGERS

(71) Applicant: T-Mobile USA, Inc., Bellevue, WA (US)

(72) Inventor: Ravikiran Reddy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 20 days.

(21) Appl. No.: 15/828,083

(22) Filed: Nov. 30, 2017

(65) Prior Publication Data

US 2019/0166255 A1    May 30, 2019

(51) Int. Cl.
| | | |
|---|---|---|
| *H04M 7/00* | (2006.01) | |
| *H04L 29/06* | (2006.01) | |
| *H04M 3/42* | (2006.01) | |
| *H04L 29/08* | (2006.01) | |
| *H04M 3/38* | (2006.01) | |

(52) U.S. Cl.
CPC ............ *H04M 7/003* (2013.01); *H04L 63/08* (2013.01); *H04L 65/1046* (2013.01); *H04L 65/1069* (2013.01); *H04L 65/40* (2013.01); *H04M 3/42153* (2013.01); *H04L 67/02* (2013.01); *H04L 67/306* (2013.01); *H04M 3/38* (2013.01); *H04M 2203/6081* (2013.01)

(58) Field of Classification Search
CPC .... H04M 7/003; H04L 63/08; H04L 65/1046; H04L 65/1069; H04L 65/40; H04L 67/02
USPC ..................................................... 379/201.01
See application file for complete search history.

(56) References Cited

U.S. PATENT DOCUMENTS

| | | | | |
|---|---|---|---|---|
| 6,834,048 B1 * | 12/2004 | Cho | ...................... | H04M 7/003 370/356 |
| 7,031,713 B2 * | 4/2006 | Schwinke | ............. | H04W 48/20 370/329 |
| 2005/0097189 A1 * | 5/2005 | Kashi | ...................... | G06F 9/543 709/217 |
| 2007/0040656 A1 * | 2/2007 | Hwang | ............. | H04M 1/27455 340/286.06 |
| 2010/0081423 A1 * | 4/2010 | Knight | .................... | H04L 12/14 455/422.1 |
| 2016/0150089 A1 * | 5/2016 | Garg | ...................... | H04M 7/003 370/352 |

* cited by examiner

*Primary Examiner* — Ahmad F. Matar
*Assistant Examiner* — Jirapon Intavong
(74) *Attorney, Agent, or Firm* — Lee & Hayes, P.C.

(57) ABSTRACT

A telephony client application may dynamically generate call links to trigger calls from a web page. The telephony client application may detect web browsing activity on a personal computer and analyze incoming page data for text elements indicating contact numbers. Upon identification of possible contact numbers, the page data may be "enhanced" or modified to include links to trigger a call to the contact number. The web browser may display the enhanced page. If the user selects one of the links, the telephony client application may send a request, to a service provider, to initiate communication with the selected contact number. In some configurations, a user may specify preferences for selecting a preferred phone number to originate the call. Accordingly, calls may be placed with a click on an enhanced web page from a desktop as if the user is placing a call from a mobile phone.

20 Claims, 4 Drawing Sheets

DYNAMICALLY GENERATED CALL TRIGGERS

BACKGROUND

A mobile phone device, such as a smart phone, may be capable of triggering phone calls when the user selects a phone number from any web sites. For example, when a user is browsing for the nearest fine dining restaurant from the smart phone, the user may select the phone number and the mobile phone may display an option to "Call" or "Cancel." When the same user wishes to place a phone call while browsing for a restaurant on a personal computer, such as a desktop or laptop, the user has to manually dial the phone number on a phone, or copy-and-paste the phone number to a calling application to place the call.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 is a flow diagram of an illustrative process for dynamically generating call triggers to automatically placing calls and selecting a user account to originate the call from.

DETAILED DESCRIPTION

This disclosure is directed to techniques for using a telephony client application to dynamically generate selectable call links for contact numbers on incoming web pages. The pages may be presented with the links embedded. The user may select one of the embedded links to trigger a call to the selected contact number. Using the telephony client application, voice and/or video conversations may be seamlessly triggered from a browser on a personal computer as if the user is placing calls from a mobile phone, but without the restriction of using only the Mobile Station International Subscriber Directory Number (MSISDN) associated with the mobile phone. Rather, the telephony client application may allow the user to link multiple phone numbers to a single user account, and the originating number used to place calls may be determined based on the user preference setting or on a user selection among multiple presented numbers associated with a user account.

The dynamically generated selectable links may be generated by the telephony client application as a stand-alone desktop application or by addons/extensions for different browsers. A stand-alone telephony client application, which may be provided by a phone service provider, installed on a personal computer, may automatically connect and authenticate the personal computer when powered on and may remain active in the background to detect browsing activity. The telephony client application may also be installed as extensions (add-ons, plugins) for specific browsers to detect browsing activity. The telephony client application may be implemented using one or more collections of protocols. The one or more collections of protocols may also be standardized protocols, such as WebRTC ("Web Real-Time Communication"), which is an open framework that enables real-time communication in the browser. Additionally, the telephony client application may be implemented to provide communication services from a specific phone service provider, such as DIGITS from T-Mobile. The telephony client application may determine that an incoming page contains contact numbers, and may generate and embed selectable triggers for any contact numbers. In some situations, the telephony client application may determine that page includes contact numbers that are already tagged with links. In which case, where possible—not barred by hardware limitations or legal limitations, the telephony client application may modify the links to trigger calls using the services of the phone service provider. A user selection of one of the dynamically generated selectable link may trigger a voice communication session originating from a preferred user number.

Initially, the telephony client application may request that a user register for a user account with a phone service provider to authorize use of the MSISDN and to handle incoming and outgoing communication requests. During registration, the user may link one or more MSISDN associated with the user and then specify a preferred number, or create rules for selecting a preferred number to use for outgoing communication. If the user account is linked to more than one MSISDN, the originating number for outgoing communications may be determined by user settings including preference based on networks, devices, or specific rules. The phone service provider may display the corresponding MSISDN owner's name for caller identification purposes, though the name displayed may also be based on the account settings for the MSISDN.

The user may create user preference settings to designate an originating number to use based on the various conditions such as network or device used. For instance, a user may specify a preference to use a work number when using a laptop at work network and to use a personal number when using the same laptop at home network. Alternatively, the user preference setting might designate specific hours for calls placed from a laptop as using a work account and default to personal account otherwise. Additionally, the user preference setting may specify that all calls place from a home desktop should always use a personal number.

This telephony client application provides a number of benefits over the traditional calling applications by integrating the dynamically generated call trigger feature. The user experience may be improved by the seamless click to call feature. Additionally, the phone service provider may reduce the use of unnecessary bandwidth from incorrectly placed calls. That is, this feature could prevent countless user dialing errors, whether from the user incorrectly entering the number or a bad copy-and-paste error. The phone service provider affiliated with the telephony client application may reroute calls intended for multiple mobile phones each having a different phone number to a single computing device through a user account. The telephony client application may place outgoing communication and receive incoming communication for multiple linked phone numbers under one user account on one device. This allows the user to communicate through multiple phone accounts without the hassle of carrying multiple phone devices. By adding the dynamically generated call triggers to seamlessly trigger phone calls, the user may be further encouraged to consolidate multiple mobile phones to a single device. This consolidation of multiple mobile phones to a single device may allow the cellular phone service provider to further save bandwidth by not having to register multiple mobile phones to a cell.

The techniques and systems described herein may be implemented in a number of ways. Example implementations are provided below with reference to the following figures.

Figure 1:
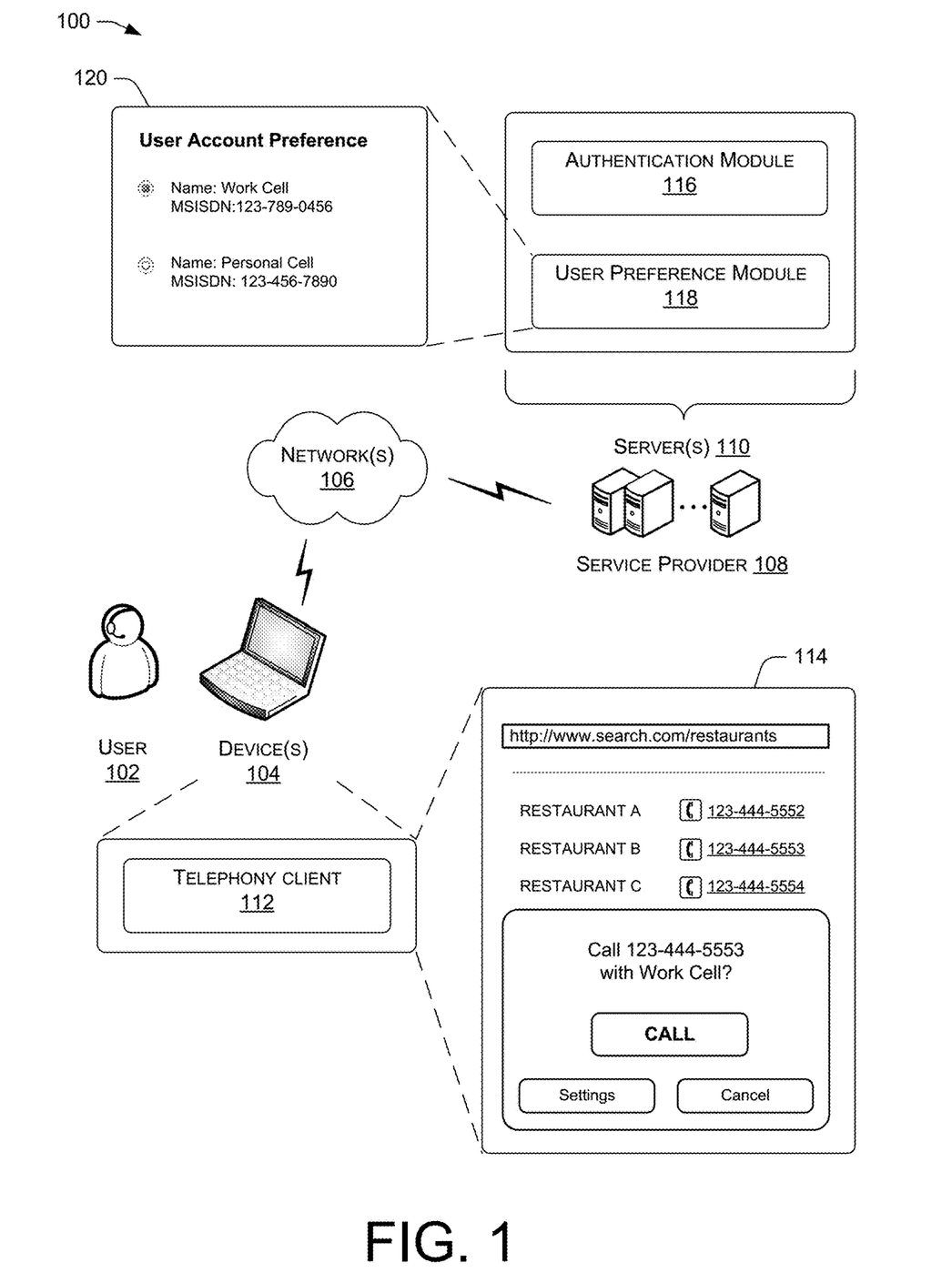
FIG. 1 is a schematic diagram of an example system for triggering a voice communication, from portable personal computer, using dynamically generated call triggers in a browser.

FIG. 1 is a schematic diagram of an example system 100 for a telephony client system that triggers voice communication, from a portable personal computer, using dynamically generated call triggers embedded into a web page. The system 100 may include user(s) 102 having one or more device(s) 104 and service provider 108 having one or more server(s) 110 to provide phone services to the user(s) 102. The device(s) 104 may be authenticated by the server(s) 110 over one or more network(s) 106.

The network(s) 106 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), and the like. The term "data network" refers to the data packets that are transmitted and received within the network(s) 106. The data packets may be used to carry voice traffic using VoIP or other technologies as well as data traffic. Moreover, the servers 110 and/or the devices 104 may communicatively couple to the network(s) 106 in any manner, such as by a wired or wireless connection.

The user 102, who may be a phone account owner or an authorized user of the phone account with the service provider 108, may interact with the service provider 108 via a site (i.e., a website), a service provider application (such as the telephony client 112), a brick-and-mortar location, a self-service interface, a self-service merchant portal, or in any other manner. The user(s) 102 may be in possession of one or more mobile phone devices under a phone service plan with the service provider 108. In some examples, the user(s) 102 may request to place calls using mobile phone numbers through the service provider 108, but from personal computing devices 104 rather than the mobile phone devices.

The personal computing devices 104 (sometimes called "computing devices," "user devices," "personal computing devices," "desktops," "laptops," or "devices") may be used to place outgoing voice communications and receive incoming voice communications by sending a communication request to the service provider 108. Each device 104 may implement the telephony client 112, which is stored in memory of the device 104 and executable by one or more processors of the device(s) 104. The devices 104 may be or include any personal computing devices, include desktop, laptop, or other type of computing device not having native calling functions like a mobile phone which may block certain features such the dynamically generated call triggers. A user 102 may be associated with the device(s) 104, and the user 102 may register one or more device(s) 104 to use the telephony client 112 provided by the service provider 108.

The service provider 108 may be any entity, server(s), platform, etc., that provides phone services for users. In some examples, the service provider 108 may also provide items (e.g., mobiles phones, tablets, etc.) to users to enable the users to utilize their phone services. As shown, the service provider 108 may include one or more server(s) 110. The servers(s) 110 may be implemented in a non-distributed computing environment or may be implemented in a distributed computing environment, possibly by running some modules on devices 104 or other remotely located devices. The server(s) 110 may be any type of server, such as a network-accessible server.

In various examples, the service provider 108 may present items to users on behalf of itself, the users 102, and/or other entities. The items may include products, services, digital items, or other types of items. In at least one example, the service provider 108 may be a cellular phone service provider who may provide communication applications such as telephony client 112 for current cellular service users 102 to extend the use of their cellular account to place calls from personal computers. For instance, the telephony client 112 may present example user interface 114 to allow user 102 to send a communication request to service provider 108, among other possible uses.

Initially, the telephony client 112 may request that the users 102 register their personal computing devices with the service provider before trying to place calls from those personal computing devices. The telephony client 112 may prompt the user 102 may create a user account with the service provider 108 if an account to use the telephony service has not be created. During registration, the user may link one or more phone numbers, which the user is authorized to use, to a user account. Then, the user may specify a user preference setting, which may be saved locally on stored on a database by the user preference module 118, to create rules for selecting an originating number to place outgoing communication.

As a non-limiting example, in the example user preference 120, the user has linked two phone numbers that the user has permission to use. Both phones are serviced by the phone service provider 108. In the example user preference 120, the user assigned the names "Work Cell," and "Personal Cell" to the two numbers. Using this example, the user has a cellphone provided by work and a personal cellphone. The user has created a simple user preference setting to simply use the phone number associated with the work phone as the originating number to place a call. The example user interface 114 shows that the user is asked to confirm if he would like to place a call to a selected destination number with "Work Cell."

In some examples, the telephony client 112, on the personal computing device(s) 104, may establish data communication with the servers 110 through a data connection via the network(s) 106. The telephony client 112 may be a calling application, supplied by the service provider 108, that requests to place calls (e.g., voice and/or video) using the data network 106.

In various examples, the personal computing device(s) 104 is authenticated by the authentication module 116 before the personal computing device(s) 104 may utilize any services provided by the service provider 108. The authentication module 116 may perform various types of authentication. The authentication module 116 may interact with a database to store and updates the database containing user subscription information, including items such as user identification and addressing (e.g., the IMSI (International Mobile Subscriber Identity) and MSISDN (Mobile Subscriber ISDN Number)), user profile information (e.g., subscription data). The authentication module 116 may also be configured to perform other operations.

As briefly discussed, the personal computing device(s) 104 may request to initiate a communication. According to some examples, the request may be a request to originate a voice call, a video call, or some other type of electronic communication. In some configurations, the determination of whether to establish the communication over the data network 106 is based on availability of the networks. For example, if the data network 106 is not available (e.g., the signal strength of a data network is below a specified threshold or there is no data network within range), the telephony client 112 may prompt the user 102 to move or connect to a different network, or if available the telephony client 112 may provide the option to send a text message from the preferred originating number.

Figure 2:
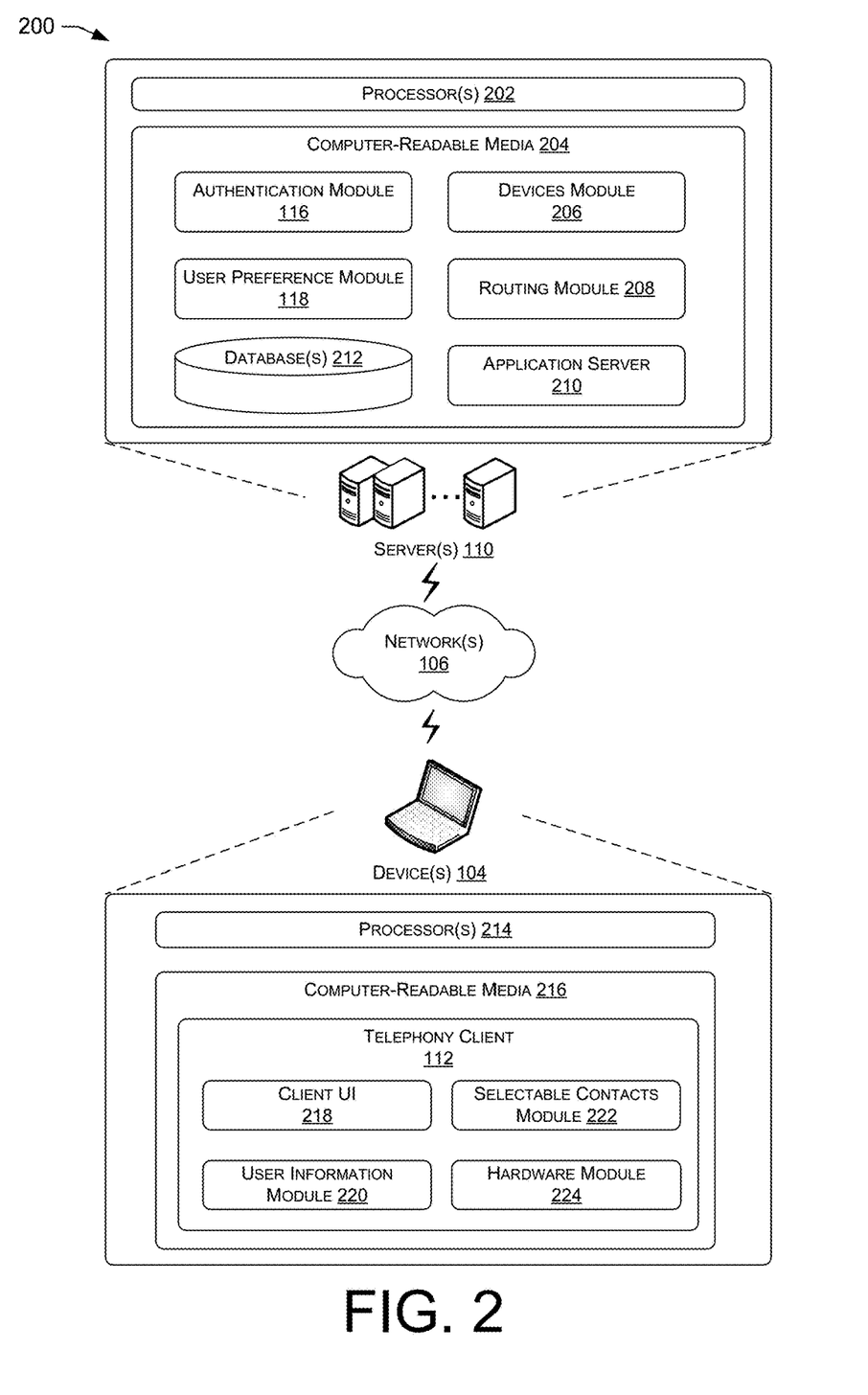
FIG. 2 is a block diagram of an illustrative computing architecture of provider servers and an illustrative computing architecture of a personal computing device.

FIG. 2 is a block diagram of an illustrative computing architecture 200 of provider servers 110 and user devices 104. The computing architecture 200 may be implemented in a distributed or non-distributed computing environment.

The computing architecture 200 of the server(s) 110 may include one or more processor(s) 202, and one or more computer-readable media 204 that stores various modules, applications, programs, or other data. The computer-readable media 204 may include instructions that, when executed by the one or more processors 202, cause the processors to perform the operations described herein for the system 100.

The computing architecture 200 of the device(s) 104 may include one or more processor(s) 214, and one or more computer-readable media 216 that stores various modules, applications, programs, or other data. The computer-readable media 216 may include instructions that, when executed by the one or more processor(s) 214, cause the processors to perform the operations described herein for the system 100.

In various embodiments, the computer-readable media 204 and the computer-readable media 216 generally include both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable media 204 and the computer-readable media 216 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the respective devices.

In some embodiments, the computer-readable media 204 may store the authentication module 116, the user preference module 118, the device module 206, the routing module 208, the application server 210, and the database(s) 212. The computer-readable media 204 may also include other types of instructions and data, such as an operating system, device drivers, etc. The components may be stored together or in a distributed arrangement.

The application server 210 may be serve as a portal for the user 102 to sign up for services with the service provider 108. In various examples, the application server 210 may provide an interface for the user(s) 102 to register new user accounts and download one or more applications associated with the service provider 108, such as the telephony client 112. The application server 210 may communicated with devices(s) 104 through the telephony client 112 to receive or update user settings. After creating a user account to access telephony service with the application server 210, a user may interact with the application server 210 through a service provider website or a service provider application, such as the telephony client 112, to actively manage user account including adding or deleting linked phone numbers, users, or computing devices.

The authentication module 116 may perform various types of authentication. The authentication module 116 may interact with the database(s) 212 to store, retrieve, and update the database(s) 212 containing user subscription information, including items such as user identification and addressing (e.g., the IMSI (International Mobile Subscriber Identity) and MSISDN (Mobile Subscriber ISDN Number)), user profile information (e.g., subscription data). The authentication module 116 may also be configured to perform other operations.

Initially, the authentication module 116 may interact with the application server 210 and/or the telephony client 112 to provide an interface for a user to register a new user account. As part of registration, the authentication module 116 may determine whether a user authorized to use the service provided by service provider 108. After the user account is created, the authentication module 116 may provide one or more options to link phone numbers to the user account. In some examples, the authentication module 116 may interact with database 212 to retrieve and provide the list of phone numbers that the user 102 is authorized use with the service provider 108. Additionally, and/or alternatively, the authentication module 116 may provide options for the user 102 to manually link phone numbers (by devices or MSISDN). While linking the phone numbers, a user may assign a name to each phone number to enable the user to remember the accounts, and the authentication module 116 may save the user account information and settings to the database 212. After the user(s) 102 has installed the telephony client 112 to their device(s) 104, the authentication module 116 may authenticate the device(s) 104 to send and receive communication using a user account. Upon a restart of the device(s) 104, the telephony client 112 may automatically send a request to the authentication module 116 again to authenticate the device(s) 104 and reconnect the device(s) 104 to send and receive communication through the service provider.

The user preference module 118 may save a user preference setting to determine which number to originate calls. The user preference module 118 may interact with the authentication module 116 to link one or more phone number that the user is authorized to use. If the user links only one phone number, the user preference module 118 may automatically set the preferred number to the one phone number.

In various examples, if the user links more than one phone number, the user preference module 118 may present options for the user preference setting to create and save rules for determining which preferred number to use based on conditions, including but not limited to, the current personal computing device used, the current location of the device, and the current time. For instance, a user may specify a preference to use a work number when using a laptop at work network and to use a personal number when using the same laptop at home network. Additionally, the user might designate specific hours for calls placed from a laptop as using a work account and default to personal account otherwise. The user preference setting may be a set of logic rule. For instance, the user may set one or more rules: (1) if device is "home desktop" to always use personal phone number, (2) else if device is "work laptop" and if current time is between 9 am-5 pm on Monday-Friday, to use work number, (3) else use work number.

In some examples, the user preference module 118 may also save a user preference data file locally to the user computing device 104 to help determine which phone number to originate the call without querying the server. In at least one example, the user preference module 118 may send the user preference data file to the user computing device 104 after the device is authenticated by the authentication module 116, if the user preference data file has changed.

The devices module 206 may serve as a device gateway for the service provider 108. Initially, the devices module 206 may serve as a device registration portal for the device(s) 104 before it can use services or download applications provided by the service provider 108. As part of registration, the devices module 206 may receive device information from the device itself or the device information may be manually added. In some examples, the devices module 206 may assign a unique identifier code to the device(s) 104 as part of the registration. The devices module 206 may associate the unique device identifier code with a user account and allow the user to assign names to the device. The names assigned by the user may be any string of characters created by the user to help identify which device is associated with the unique device identifier code. In various examples, the devices module 206 may save, edit, and retrieve the list of devices associated with a user account to the database 212.

The routing module 208 may be used to setup, route, and place calls from the computing device(s) 104. If a user account is linked to more than one phone numbers (MSISDN), the routing module 208 may help place a call from a preferred originating number to a destination number. In various examples, the routing module 208 may place calls from the originating number and provide data to display the corresponding name associated with the originating number for caller identification display purpose.

The database 212 may store at least some data including, but not limited to, data collected from authentication module 116, user preference module 118, device module 206, routing module 208, and application server 210, including data associated with user data and device data. In some examples, the data may be automatically added via a computing device (e.g., servers 110) or client applications associated with the service provider (e.g., telephony client 112). User data and devices data may correspond to one or more user(s) 102 using services of the service provider 108. In various examples, user data may include information associated with the user such as payment information, subscription information, devices owned, user preference setting, phone numbers and/or devices the user has permission to use, etc. In additional and/or alternative examples, at least some of the data may be stored in a cloud storage system or other data repository.

The computer-readable media 216 may include instructions that, when executed by the one or more processors 214, cause the one or more processors to perform the operations described herein for the system 100. In some embodiments, the computer-readable media 216 may store the telephony client 112 and associated components, which are described in turn. The computer-readable media 204 may also include other types of instructions and data, such as an operating system, device drivers, etc. The components may be stored together or in a distributed arrangement.

The telephony client 112 may include the client UI 218, the user information module 220, the selectable contacts module 222, and the hardware module 224. In various examples, if the telephony client 112 is installed as a stand-alone desktop application, at least one or more components of the telephony client 112 may automatically connect the device 104 to the server 110 when the device 104 is turn on and remain active in the background. Alternatively, and/or additionally, if the telephony client 112 is installed as an extension, at least one or more components of the telephony client 112 may automatically connect the device 104 to the server 110 when the browser with the extension installed is running. In some examples, the hardware module 224 may run a hardware check before authenticating the device 104 to verify if the device 104 is capable of voice and/or video communication.

The client UI 218 may present a user interface for the user 102 to register the device 104. With the input received through the client UI 218, the telephony client 112 may send a registration request to register the computing device 104 with a phone service provider's network. For example, the telephony client 112 may send the registration request to the server(s) 110 to register the computing device 104 with the service provider 108. The client UI 218 may present a call confirmation for the user 102 to confirm the originating number and destination number.

The user information module 220 may interact with the client UI 218 to allow the user to add and remove phone numbers linked to the user account. The user information module 220 may save one or more user data files locally for one or more users 102 that uses the device 104. In various examples, the user information module 220 may allow the user to change the general device settings and user preference settings, and may send the changes to the server 110. Additionally, and/or alternatively, the user information module 220 may allow the user to override the preferred originating number. For instance, the client UI 218 may present a call confirmation for the user 102 to confirm placing a call from a preferred originating number and destination number, but the user 102 wishes to change the originating number for this call. The user information module 220 may interact with the client UI 218 to present a number selecting interface for the user 102 to select a user selection among multiple presented numbers associated with a user account.

The selectable contacts module 222 may detect incoming web page data from the web browser(s). The selectable contacts module 222 may analyze the web page data and determine that the web page may include one or more contact numbers. In various examples, the selectable contacts module 222 may analyze the data on the page to locate the textual elements, and scan for text that may indicate a contact number. In additional examples, the selectable contacts module 222 may also analyze image data on the page to locate the textual elements using text recognition tools, such as OCR, and scan for text that may indicate a contact number. If a possible contact number is found in the text or image data, the selectable contacts module 222 may generate a link to trigger a call to the contact number and tag the associated textual elements.

In some examples, the selectable contacts module 222 may code the links in response whether the telephony client 112 is a browser extension or a default system phone setting of the device. For instance, if the telephony client 112 is a stand-alone desktop application and the user has set the default system phone setting to use the telephony client 112, the selectable contacts module 222 may code the link to trigger a call using the default system phone. However, if the telephony client 112 is a browser extension or the default system phone is set to a different phone application, the selectable contacts module 222 may code the link to trigger a call with the telephony client 112 or using a connection link to the application server 210.

Additionally, the selectable contacts module 222 may analyze the incoming web data and identify any existing links tagging the contact number during the scan for text that may indicate a contact number. That is, the contact number may already include links to trigger calls. The selectable contacts module 222 may analyze the links and determine whether to modify the links or not. If the link is coded to triggers a call using the default system phone and the default system phone is set to use the telephony client 112, the selectable contacts module 222 may determine to leave the link unmodified. If the link is coded to triggers a call or other communication through a different application, where the modification is permitted, the selectable contacts module 222 may determine to modify the link to trigger a call with the telephony client 112 or using a connection link to the application server 210. After the selectable contacts module 222 completes the process to analyze and/or modify the incoming web page data, the web page data may be presented in the web browser(s).

Accordingly, the selectable contacts module 222 may generate new links or modify existing links based varying conditions. The variation on creating or modifying links are provided for purposes of discussion, the selectable contacts module 222 may implement the links to include any routines, programs, objects, components, data structures, etc., for performing tasks of utilizing the telephony services provided by the service provider 108 for sending and receiving communication using the device 104.

In additional examples, if the telephony client 112 is a stand-alone desktop application such that the telephony client 112 remains active while the device 104 is running, the selectable contacts module 222 may also parse files that can support hyperlinks, such as Microsoft Word or Adobe Portable Document Format (PDF) file, and similarly generate call triggers for the files upon opening, and the opened file may similarly be presented as an enhanced page.

Accordingly, when the user desires to originate a communication to a number through a link on the page, using the computing device 104, the user may select one of the links associated with a contact number. The telephony client 112 may send a communication request to call the contact number as the destination number (e.g., the destination of the call).

In some examples, the telephony client 112 may determine the preferred originating number based on a saved user preference setting. In an additional and/or alternative example, the telephony client 112 may contact server(s) 110 for the originating number. The telephony client 112 may send, to the server(s) 110, a communication request that may include the user account information, the unique device identifier code, an originating number, and/or the destination number. The communication request informs the server(s) 110 that a communication will be placed from the computing device 104.

After receiving the communication request, the authentication module 116 may authenticate the communication request and determine whether the account associated with the number is authorized to originate calls. For example, the authentication module 116 may retrieve account information from the database(s) 212 to determine if the account associated with the originating number is authorized. When the account associated with the user 102 of the device 104 is not authorized, the server(s) 110 may send a message to the device 104 denying the communication request. When the account associated with the originating number is authorized to originate calls, the server(s) 110 may place the communication to the computing device(s) associated with the destination number. The server(s) 110 may also provide communication information, such as described above, to the application server 210 that is assigned to handle requests for the originating number.

The hardware module 224 may interact with the operating system and device drivers of the device 104 to verify that the device 104 has the necessary hardware to place a voice and/or video communication. Because the personal computing device 104 may not have a built-in microphone, speaker, and/or camera, the hardware module 224 may confirm with a system hardware manager that the computing device 104 have working audio and/or imaging devices, including but not limited to microphone, headphones, speakers, camera, and headsets, before placing communication request. The hardware module 224 may interact with the client UI 218 to present hardware test options to verify that the audio and/or imaging devices are working correctly with the telephony client 112.

Figure 3:
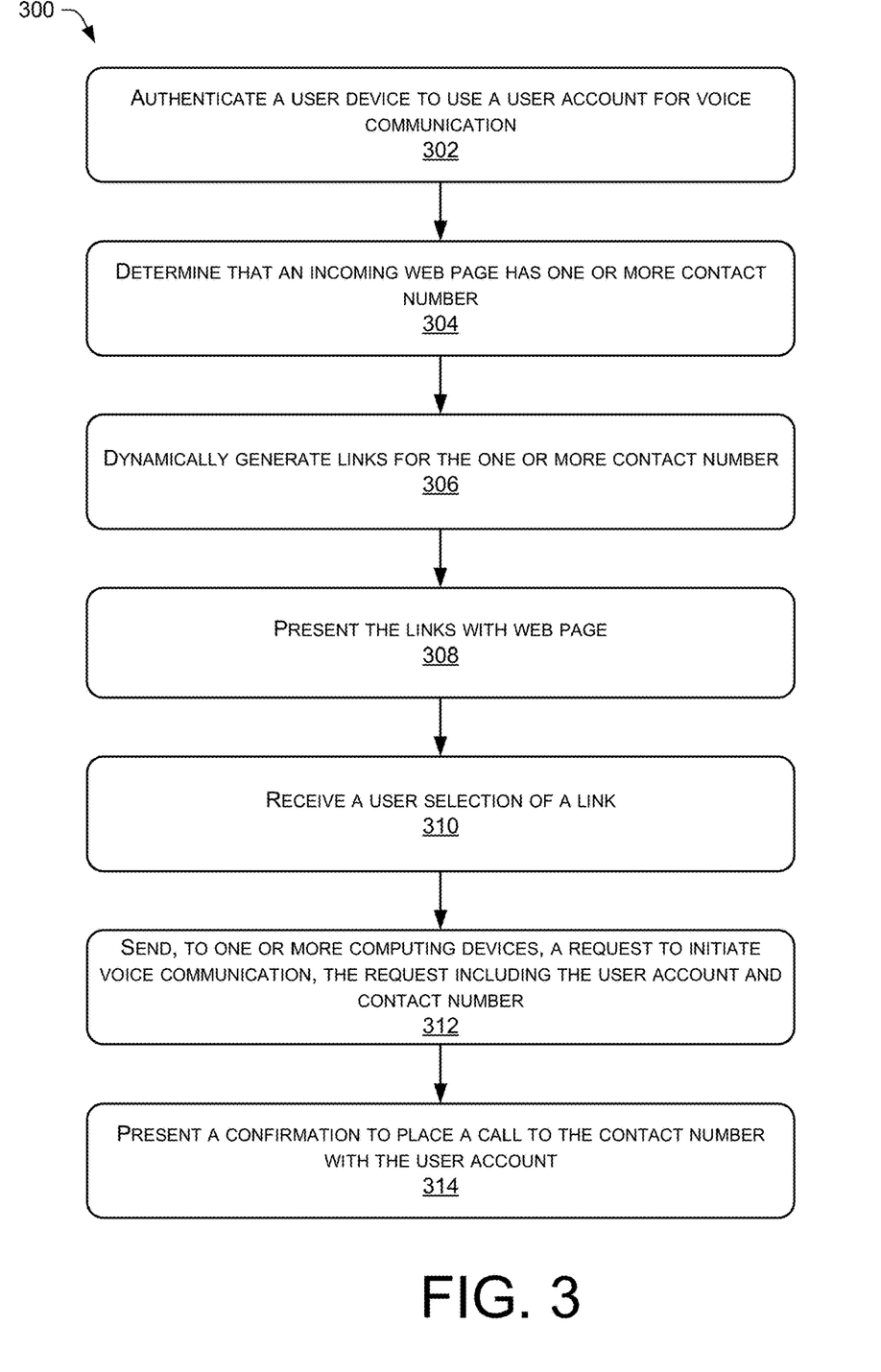
FIG. 3 is a flow diagram of an illustrative process for authenticating a user computing device to a user account to automatically place calls using dynamically generated call triggers from web browsers.
Figure 4:
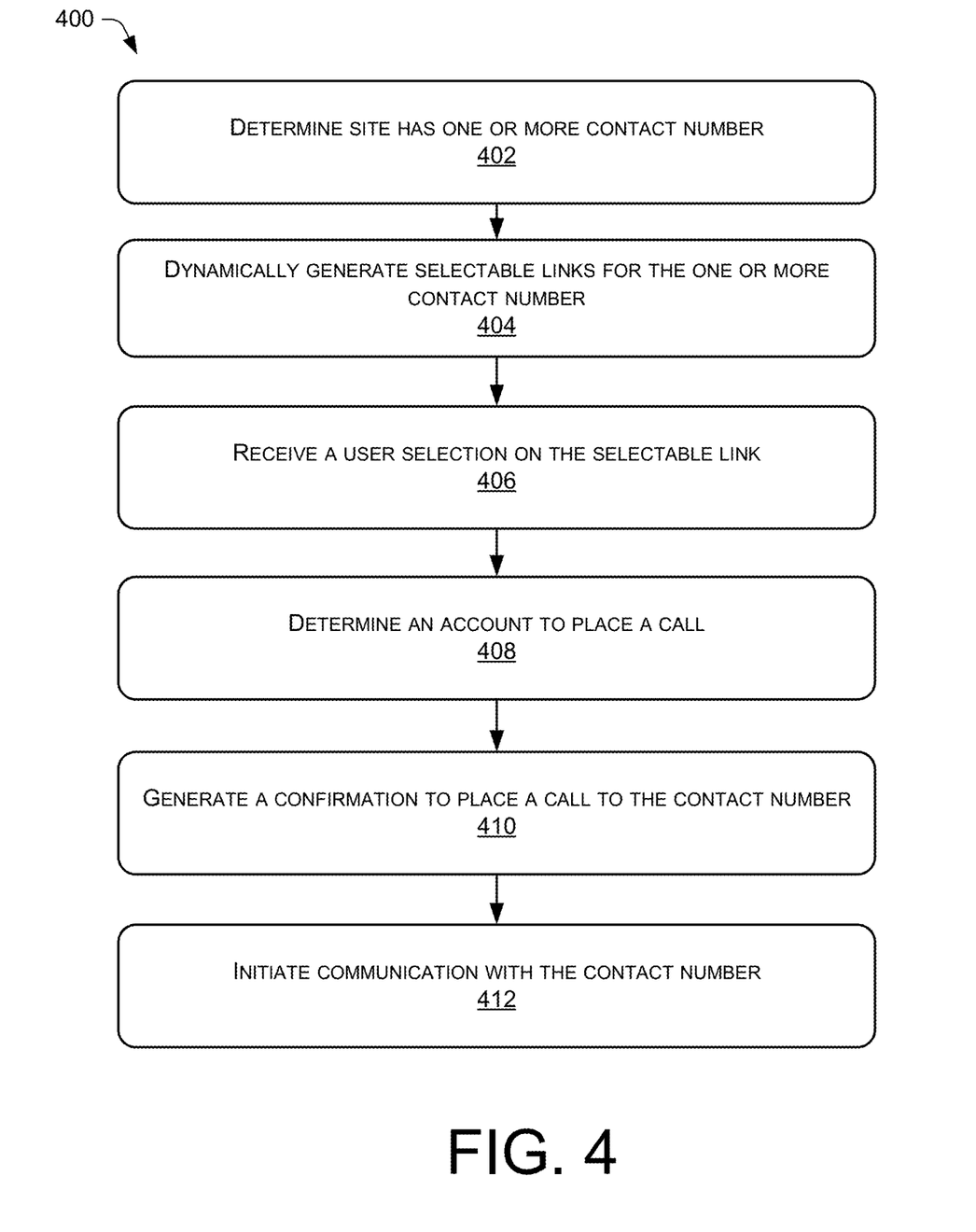

FIGS. 3 and 4 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process 300 for authenticating a user computing device to a user account to automatically place calls using dynamically generated call triggers from web browsers. The process 300 is described with reference to the system 100 and may be performed by the devices 104 and/or in cooperation with any one or more of the servers 110. Of course, the process 300 may be performed in other similar and/or different environments.

At 302, the telephony client 112 may send a request to servers 110 to authenticate the user device to use the telephony services provided by the service provider 108. If telephony client 112 is installed as a stand-alone desktop application, the telephony client 112 may automatically request the servers 110 to authenticate the device 104 when first powered on. If the telephony client 112 is installed as an extension, the telephony client 112 may send a request to servers 110 to authenticate the user device when the browser with the extension installed is running. In some examples, the hardware module 224 may run a hardware check before authenticating the device 104 to verify if the device 104 is capable of voice and/or video communication.

At 304, the selectable contacts module 222 may determine that an incoming web page has one or more contact numbers. The user device may receive incoming web page data and the selectable contacts module 222 may analyze the data to locate the textual elements and scan for text that may indicate a contact number. In additional examples, the selectable contacts module 222 may also analyze image data on the page to locate the textual elements using text recognition tools, such as OCR, and scan for text that may indicate a contact number.

At 306, the selectable contacts module 222 may dynamically generate links for the one or more contact number. The links may be coded in response whether the telephony client 112 is a browser extension or a default system phone setting of the device. For instance, if the telephony client 112 is a stand-alone desktop application and the user has set the default system phone setting to use the telephony client 112, the selectable contacts module 222 may code the link to trigger a call using the default system phone. However, if the telephony client 112 is a browser extension or the default system phone is set to a different phone application, the selectable contacts module 222 may code the link to trigger a call with the telephony client 112 or using a connection link to the application server 210.

At 308, after the selectable contacts module 222 completes the process to analyze and modify the incoming web page data, the modified web data containing one or more generated links may be presented in the web browser(s).

At 310, the computing device 104 may receive a user selection of a link on the page. When the user desires to originate a communication to a number through a link on the page, using the computing device 104, the user may select one of the links associated with a contact number. The telephony client 112 may send a communication request to call the contact number as the destination number (e.g., the destination of the call.

At 312, the telephony client 112 may send to the servers 110, a request to initiate voice communication, the request including the user account and contact number. The telephony client 112 may determine the preferred originating number based on a saved user preference setting. In an additional and/or alternative example, the telephony client 112 may contact server(s) 110 for the originating number based on the user account. The telephony client 112 may send, to the server(s) 110, a communication request that may include the user account information, the unique device identifier code, an originating number, and/or the destination number. The communication request informs the server(s) 110 that a communication will be placed from the computing device 104. The communication may include a call from the originating number to the destination number, or in this case, the contact number.

At 314, the client UI 218 may present a call confirmation for the user 102 to confirm the contact number as the destination number and the originating number as determined by the user preference setting. Although the flow diagram illustrates this process as occurring after sending the request to initiate communication, this confirmation may be presented before the sending the request if the device is able to determine the originating number beforehand.

FIG. 4 is a flow diagram of an illustrative process 400 for dynamically generating call triggers to automatically placing calls and selecting a user account to originate the call from. The process 400 is described with reference to the system 100 and may be performed by the devices 104 and/or in cooperation with any one or more of the servers 110. Of course, the process 400 may be performed in other similar and/or different environments.

At 402, the selectable contacts module 222 may determine that an incoming web page has one or more contact numbers. The user device may receive incoming web page data and the selectable contacts module 222 may analyze the data to locate the textual elements in both the text data and image data, and scan for text that may indicate one or more contact numbers.

At 404, the selectable contacts module 222 may dynamically generate links for the one or more contact number. The links may be coded in response whether the telephony client 112 is a browser extension or a default system phone setting of the device. For instance, if the telephony client 112 is a stand-alone desktop application and the user has set the default system phone setting to use the telephony client 112, the selectable contacts module 222 may code the link to trigger a call using the default system phone. However, if the telephony client 112 is a browser extension or the default system phone is set to a different phone application, the selectable contacts module 222 may code the link to trigger a call with the telephony client 112 or using a connection link to the application server 210.

At 406, the computing device 104 may receive a user selection of a link on the page. When the user desires to originate a communication to a number through a link on the page, using the computing device 104, the user may select one of the links associated with a contact number.

At 408, the telephony client 112 may determine the preferred originating number based on a saved user preference setting or the telephony client 112 may contact server(s) 110 for the originating number based on the user account. If the user account is linked to multiple phone numbers, the user preference setting may be used to determine which the preferred number (from the multiple phone numbers) to use based on conditions. The conditions include, but is not limited to, the current personal computing device used, the current location of the device, and the current time. For instance, a user may specify a preference to use a work number when using a laptop at work network and to use a personal number when using the same laptop at home network. Additionally, the user might designate specific hours for calls placed from a laptop as using a work account and default to personal account otherwise. The user preference setting may be a set of logic rule. Application of the logic rule from the user preference setting to determine the preferred originating number may be performed by either the device 104 or the server 110.

At 410, the client UI 218 may present a call confirmation for the user 102 to confirm the contact number as the destination number and the originating number as previously determined by the user preference setting.

At 412, the telephony client 112 may send to the servers 110, a request to initiate communication, the request including the contact number. The telephony client 112 may further include in the request: the user account information, the unique device identifier code, an originating number, and/or the destination number. The communication request informs the server(s) 110 that a communication will be placed from the computing device 104. The communication may include a call from the originating number to the destination number, or in this case, the contact number.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method performed by one or more processors configured with specific instructions, the computer-implemented method comprising:
sending, to one or more computing devices over a network, a registration request from a user device to use telephony services associated with a user account;
receiving page data associated with an incoming web page;
analyzing the page data to determine that the page data includes one or more contact numbers;
modifying the page data to include one or more call links respectively associated with the one or more contact numbers, wherein modifying the page data to include the one or more call links further includes:
performing analysis on the page data to determine whether the one or more contact numbers include link tags,
upon determining that the one or more contact numbers include a link tag based on the analysis:
determining whether the link tag is coded to trigger a call using a default system phone,
upon determining that the link tag is coded to trigger the call using the default system phone, refraining from creating a call link to trigger a call to the one or more contact numbers, and
upon determining that the link tag is not coded to trigger the call using the default system phone, modifying the link tag to trigger a call to the one or more contact numbers,
upon determining that the one or more contact numbers do not include a link tag based on the analysis:
creating a call link to trigger a call to the one or more contact numbers;
presenting the page data including the one or more call links as a web page;
receiving input associated with a selected call link from the one or more call links; and
sending, to the one or more computing devices over the network, a communication request, the communication request including a contact number associated with the selected call link as a destination number.

2. The computer-implemented method of claim 1, wherein analyzing the page data includes:
analyzing the page data to locate text elements; and
scanning the text elements for text indicating the one or more contact numbers.

3. The computer-implemented method of claim 1, wherein the network is a Wi-Fi network, the user device is a laptop, and the one or more computing devices is associated with a phone service provider.

4. The computer-implemented method of claim 1, further comprising determining an originating number based at least in part on a user preference setting before sending the communication request, and wherein the communication request further includes the originating number.

5. The computer-implemented method of claim 4, further comprising presenting a confirmation on a user interface to place a call to the destination number from the originating number before sending the communication request.

6. The computer-implemented method of claim 1, wherein sending the communication request includes determining that a signal strength of the network exceeds a threshold value.

7. A device comprising:
one or more processors; and
one or more memories storing instructions that, when executed by the one or more processors, perform acts including:
determining that an incoming web page includes page data associated with one or more contact numbers;
generating one or more call triggers for at least one of the one or more contact numbers, wherein generating the one or more call triggers further includes:
performing analysis on the page data to determine whether the one or more contact numbers include link tags,
upon determining that the one or more contact numbers include a link tag based on the analysis:
determining whether the link tag is coded to trigger a call using a default system phone,
upon determining that the link tag is coded to trigger the call using the default system phone, refraining from creating a link to trigger a call to the one or more contact numbers, and
upon determining that the link tag is not coded to trigger the call using the default system phone, modifying the link tag to trigger a call to the one or more contact numbers,
upon determining that the one or more contact numbers do not include a link tag based on the analysis:
creating a link to trigger a call to the one or more contact numbers;
embedding the one or more call triggers as links on a web page;
receiving a selection of one of the one or more call triggers; and
sending, to one or more computing devices over a network, a request to initiate a communication session, the request including a destination number based on the selection.

8. The device of claim 7, wherein generating the one or more call triggers includes:
analyzing the page data to identify text elements; and
scanning the text elements for text indicating the one or more contact numbers.

9. The device of claim 7, wherein the acts further include sending, to the one or more computing devices over a network, an authentication request for the device to initiate communication using a user account before sending the request to initiate the communication session.

10. The device of claim 9, wherein the acts further include receiving a user preference setting specifying a preferred user number to originate a call from in response to sending the authentication request.

11. The device of claim 10, wherein the acts further include:
presenting a confirmation to initiate a call originating from the preferred user number to the destination number; and
establishing a communication session for the device using the network.

12. The device of claim 7, wherein the acts further comprise determining that the device includes a sound signal receiving device before sending the request.

13. A non-transitory computer-readable media storing computer-executable instructions that, when executed by one or more processors, cause the one or more processors of a computing device to perform acts comprising:
determining that an incoming web page includes page data associated with one or more contact numbers;
generating one or more call triggers for respective ones of the one or more contact numbers, wherein generating the one or more call triggers further includes:
performing analysis on the page data to determine whether the one or more contact numbers include link tags,
upon determining that the one or more contact numbers include a link tag based on the analysis:
determining whether the link tag is coded to trigger a call using a default system phone,
upon determining that the link tag is coded to trigger the call using the default system phone, refraining from creating a link to trigger a call to the one or more contact numbers, and
upon determining that the link tag is not coded to trigger the call using the default system phone, modifying the link tag to trigger a call to the one or more contact numbers,
upon determining that the one or more contact numbers do not include a link tag based on the analysis:
creating a link to trigger a call to the one or more contact numbers;
embedding the one or more call triggers as links on the web page;
receiving a selection of one of the one or more call triggers;
determining an origination number based at least in part on a user preference setting; and
sending, to the one or more computing devices over a network, a request to initiate a communication session, the request including a destination number based on the selection.

14. The non-transitory computer-readable media of claim 13, wherein generating the one or more call triggers for the respective ones of the one or more contact numbers includes:
analyzing the page data to locate text elements; and
scanning the text elements for text indicating the one or more contact numbers.

15. The non-transitory computer-readable media of claim 13, wherein sending the request to initiate a communication session is based, at least in part, on a signal strength of the network.

16. The non-transitory computer-readable media of claim 13, wherein the acts further comprise presenting a confirmation to initiate a call originating from the origination number to the destination number.

17. The non-transitory computer-readable media of claim 13, wherein the acts further comprise sending an authorization request, to the one or more computing devices over the network, to authenticate the computing device before sending the request to initiate the communication session.

18. The non-transitory computer-readable media of claim 13, wherein determining the origination number includes accessing the user preference setting specifying a rule to use a preferred origination number based on using the computing device.

19. The computer-implemented method of claim 1, wherein modifying the link tag to trigger a call to the one or more contact numbers includes one of:
modifying the link tag to trigger a call to the one or more contact numbers using the default system phone, or
modifying the link tag to trigger a call to the one or more contact numbers using a connection link to an application server.

20. The device of claim 7, wherein modifying the link tag to trigger a call to the one or more contact numbers includes one of:
modifying the link tag to trigger a call to the one or more contact numbers using the default system phone, or
modifying the link tag to trigger a call to the one or more contact numbers using a connection link to an application server.

* * * * *